United States Patent Office.

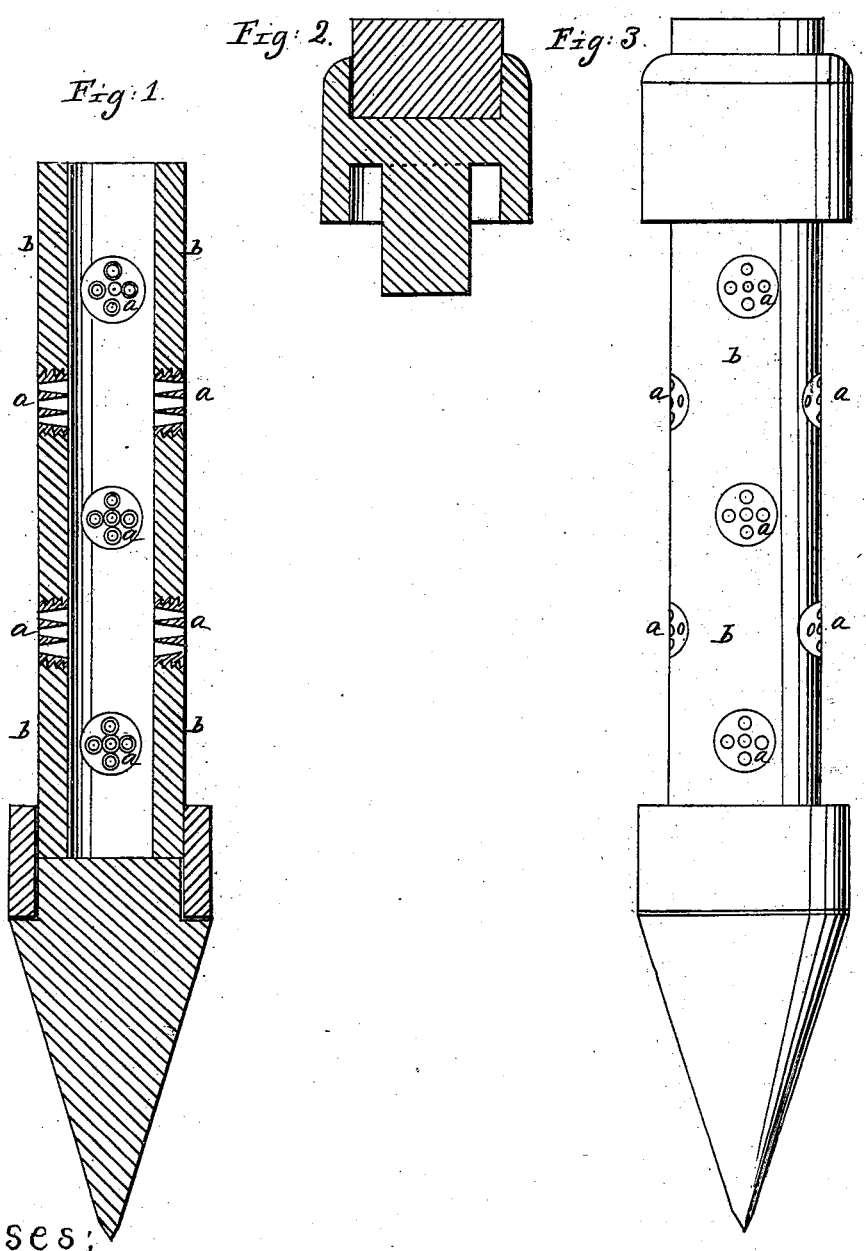

CHARLES H. COLBY, OF LYNN, MASSACHUSETTS.

Letters Patent No. 77,000, dated April 21, 1868.

IMPROVEMENT IN TUBE-WELLS.

*The Schedule referred to in these Letters Patent and making part of the same.*

TO ALL WHOM IT MAY CONCERN:

Be it known that I, CHARLES H. COLBY, of Lynn, in the county of Essex, and State of Massachusetts, have invented a certain Improvement in Well-Tubes; and I do hereby declare that the following is a true and exact description thereof, reference being had to the accompanying drawings, and to the letters of reference marked thereon, making a part of this specification, in which—

Figure 1 is a longitudinal section, showing the manner in which the strainer $a$ is inserted by a screw in the tube $b$, and the taper of the perforations in the screw-disk or plug in which they are drilled and countersunk.

Figure 2 is a device which I prefer to use for protecting the pipe while drilling.

Figure 3 is a complete lower section of the well with its point.

The nature of my invention consists in forming the perforations of the strainer $a$ larger on the inside than on the outside of the pipe $b$. The space occupied by said perforations is in the form of the frustum of a cone, increasing uniformly in capacity from the outer to the inner surface of the said pipe $b$, thus preventing any liability of their becoming clogged or obstructed, as any extraneous matter that would enter from the outside would fall through immediately by its own weight.

The screw-disks or plugs containing the perforations $a$ are composed of brass or any analogous substance, and are secured in the pipe by means of a screw cut on their surfaces to fit a corresponding thread or screw cut in the holes of the pipe for their reception, by which process the pipe is not weakened, and as the said circular disks or plugs containing the strainers $a$ are as thick as the pipe $b$, the said pipe presents a uniform surface inside and out, and thereby can be cleaned out with facility.

To enable others skilled in the art to make and use my invention, I will proceed to describe its construction.

In the pipe $b$, I drill holes one-half an inch in diameter for the reception of the screw-disk or plug containing the strainers $a$. On the surface of the said holes a thread or screw is cut. The disk or plug containing the strainers $a$ is composed of brass. It is half an inch in diameter, and of a thickness corresponding to that of the pipe. Upon its outer surface a thread or screw is cut. The perforations $a$ of the said disk or plug are drilled and countersunk in the said disk or plug, and are of the form of the frustum of a cone.

I prefer to use silver-plated metal for the said strainers $a$, thereby preventing corrosion, and securing pure and healthy water. The disks or plugs are screwed firmly into the pipe $b$ by means of a screw-driver made for the purpose. The application of a cup with a core projecting into the pipe to prevent the ends from contraction or expansion while being driven by a sledge or other means, is an important means of protecting the pipe.

I am aware that tubular wells with lateral filters in various forms have been used before, but I do not know of any which are constructed in such a manner as to present the advantages claimed in mine.

What I claim as my invention, and desire to secure by Letters Patent, is—

A tubular well, with strainers set in screw-disks or plugs, the perforations flaring inwardly, all constructed and applied as herein set forth.

CHARLES H. COLBY.

Witnesses:
J. C. STICKNEY,
C. D. WRIGHT.